United States Patent [19]

Fuchs

[11] 4,162,340
[45] Jul. 24, 1979

[54] METHOD OF MANUFACTURING SLOT INSULATION FOR DYNAMO-ELECTRIC MACHINES FROM MOLDED LAMINATES AND SLOT INSULATION PRODUCED BY THE METHOD

[75] Inventor: Heinz Fuchs, Embrach, Switzerland
[73] Assignee: Micafil AG, Zurich, Switzerland
[21] Appl. No.: 775,921
[22] Filed: Mar. 9, 1977
[51] Int. Cl.² ............................ B32B 3/08; B32B 3/00
[52] U.S. Cl. ...................................... 428/83; 156/288;
156/295; 156/330; 174/137 R; 310/215;
428/174; 428/252; 428/268; 428/273; 428/417
[58] Field of Search ................ 428/83, 174, 122, 252,
428/417; 174/110 PM, 121 R, 137 R; 310/43,
45, 194, 214–216; 156/288, 330, 295; 264/DIG.
53

[56] References Cited
U.S. PATENT DOCUMENTS
3,974,314  8/1976  Fuchs .................................. 428/212

FOREIGN PATENT DOCUMENTS
1038172  2/1959  Fed. Rep. of Germany.
2115336  10/1972  Fed. Rep. of Germany.
2338857  10/1974  Fed. Rep. of Germany.
549467  5/1974  Switzerland.
563872  7/1975  Switzerland.

*Primary Examiner*—George F. Lesmes
*Assistant Examiner*—P. Thibodeau
*Attorney, Agent or Firm*—Burns, Doane, Swecker & Mathis

[57] ABSTRACT

The method for manufacturing profiled laminated insulation material having a U- or L-shaped configuration for installation in the slots of a dynamo-electric machine wherein a number of carrier bands of an epoxide resin-impregnated or resin-coated insulation material such as a combination of layers of aromatic polyamide paper and woven glass filaments are assembled for lamination each to the other. Reinforcing plies of insulation material such as woven glass filaments or glass mats and strips of fiber-filled molding material such as containing epoxide resin and short E-glass-fibers are inserted between adjacent carrier bands at regions thereof desired to impart increased thickness to the final laminated structure, and the assembly of the carrier bands, reinforcing plies and strips of fiber-filled molding material is then pressed to effect lamination and penetration of some of the resinous-molding material into and filling spaces in transition regions between thickened and non-thickened parts of the laminated structure.

11 Claims, 4 Drawing Figures

METHOD OF MANUFACTURING SLOT INSULATION FOR DYNAMO-ELECTRIC MACHINES FROM MOLDED LAMINATES AND SLOT INSULATION PRODUCED BY THE METHOD

BACKGROUND OF THE INVENTION

This invention concerns a method for the manufacture of a slot insulation from a molded laminate for dynamo-electric machines, where the continuous resin-impregnated and/or resin-coated carrier bands, made from woven glass filaments, paper and/or other flat surface-forming materials, possess within one section of the slot insulation a laminated thickening of multiple slot insulation thickness by means of inserted reinforcing plies made from similar flat surface materials, as well as a slot insulation manufactured in accordance with this method.

The known methods are primarily employed for the manufacture of molded laminates which are used in electrical engineering as insulative materials in the form of L- and U-shapes, as well as bands of various dimensions, for example, for the insulation of the rotor windings of turbo-generators. In exceptional cases involving the slot wall insulation of these rotors, there is the need for formed parts with diverse wall thicknesses, such as L-profiles with thickened base leg, U-profiles with a thickened base or band profile with one thickened section. In order to manufacture such slot insulations with partially thickened areas, i.e., with diverse wall thicknesses, it has been necessary heretofore to produce, for example, in case of the above mentioned L-profile with thickened base leg, or a U-profile with thickened base, standard L- or U-shaped profiles and to accomplish the thickening by glueing subsequently specially manufactured small strips to the foot or the base respectively of the standard pieces. It is also possible to use two separately manufactured strip profiles and to glue these parts together in such manner that the desired sections of the slot insulation will be thickened. Usually, these parts will then require finishing operations by grinding and possible a surface treatment by use of varnish.

Slot insulations for rotating electric machines, and especially for high-output machines are primarily used in known manner in the form of fiber-reinforced molded plastic parts, for example, glassfiber-reinforced plastics (GFK). These are laminated and compressed substances with a high mechanical resistance which consist of continuous, laminated resin-carrying bands, using thermosetting resins as bonding agents, for example, the so-called hard-glass fabric, made from woven glass filaments and epoxide resin, materials which possess good electrical and thermal properties. These bands which are laminated in layers and are resin-impregnated and/or resin-coated are compounded under pressure and heat into a uniform and mechanically firm material of a desired thickness and quality.

Not only glass filament fabrics but also "roving" fabrics, glass mats and other insulating flat-surface materials, such as polyamide paper known under the tradename "Nomex," insulating foils, fine mica paper and the like, and combinations thereof can be used for the individual layers of the laminated and compressed substance.

There are other methods known where standard uniform profiles are manufactured by use of molds and pressing. Another method to manufacture profiles of laminated and compressed substances of high electrical strength, dimensional stability and of any desired length is disclosed by the published German application No. 2,113,741 where the forward movement by a pre-set distance of the reinforced band, impregnated or coated with resin, is carried out from the entrance side of the extrusion die to its center in several steps and corresponding pressing operations.

Finally, there are known from the Swiss Pat. Nos. 549,467 and 563,872 laminated and compressed substances for the insulation of electric machines and apparatus, especially for the slot insulation, with an insulative layer of high dielectric strength and resistance to temperature influences and arranged between outer layers of fiber-reinforced carrier material which is laminated for stiffening purposes and is impregnated with thermosetting resin binders, where the inner insulative layer is covered on both sides with tangled fiber layers and where these tangled fiber layers have a core which contains nothing but tangled fibers, being free of any binding agents. These new multi-layer slot insulations possess, in comparison with laminated and compressed substances of pure glass filament fabrics, a substantially improved mechanical strength and will therefore prevent in a more reliable manner electrical punctures during operations.

In order to manufacture a band that is thickened throughout a partial area only, it has been proposed to mold a plate with an overall thickness that is equal to the partial increased thickness, where the profile in the partial area, for example, the center zone, is formed by an appropriate extrusion die. The final profile is then completed by removal of the protruding outer areas, a method which is disadvantageous in view of the relatively large losses of material and the injurious cut of the fabric layers, for example, in case of a glass filament fabric.

If resin-impregnated or resin-coated carrier materials are treated with a great amount of resin excess, it becomes possible to fill some hollow spaces with the pure resin that has been forced off but these accumulations of pure resin will have an adverse effect under mechanical stresses because cracks will develop within these areas of pure resin even at slight deformations, cracks which will have the tendency to spread from there, thus creating mechanical and electric trouble spots.

SUMMARY OF THE INVENTION

It is the principal object of the invention to simplify the individual processes for the manufacture of thickened partial areas of the slot insulation and to improve the known methods in such manner that it becomes possible to produce for the slot insulation profiles with diverse wall thicknesses of the laminated and compressed substances which in electrical and mechanical respect, especially within the area of transition from the thick to the thin wall thickness, will satisfy highly demanding specifications and which will insure narrow and accurate tolerances of the dimensions without additional machining and surface treatment.

The invention solves this problem by a method where one or more strips of a fiber-filled molding material such as containing epoxide resin and short E-glass-fibers, and one or more reinforcing plies are inserted between resin-impregnated and/or resin-coated carrier bands and-/or reinforcing plies, and where during the subsequent pressing and molding operation some of the molding material is forced in such manner into initially present hollow spaces in the transition zone between a non-thickened leg of the slot insulation with continuous carrier bands and a thickened leg of the slot insulation obtained by the use of the additionally inserted reinforcing plies and molding material that a slot insulation free of hollow spaces will be produced.

This method makes it possible to manufacture profiles of laminated and compressed substances where a partial area of the slot insulation is thickened, such as the foot of an L-profile, the base of a U-profile and so on, in one single operation, and where these profiles will satisfy highly demanding requirements and specifications concerning electrical and mechanical properties and where narrow and accurate tolerances concerning the diverse thicknesses of the profiles are insured.

It will be particularly advantageous if one or more of the reinforcing plies which are each covered on both sides with strips of fiber-filled molding material, or one or more strips of fiber-filled molding material covered on both sides by reinforcing plies, and formed into a packet, are inserted between the carrier bands. This arrangement makes possible a continuous production of thickened slot insulations.

Glass fleeces, especially when consisting of short E-glass-fibers, were found to be particularly usable for the manufacture of fiber-filled resinous molding material. The commercially available fleeces of this type possess a paper-like composition and consist of very fine glass-fibers (approximately 90%) and a binding agent (10%). These fleeces are impregnated with an epoxide resin, forming so-called "prepregs" which are moldable in known manner (published German application DT-OS No. 2,020,587) into laminated, compressed materials. In order to be suitable for the preparation of a fiber-filled resinous molding material by means of the method proposed by the invention, the fleeces must contain a binding agent which will permit the resin impregnation, that is the manufacturing of the "prepreg", at a lower temperature; during the molding process at increased temperature and pressure the original fleece binder leaks out, thus reducing significantly the bond between the short fibers. The short fibers, most of them now free of the binding agent, will form, together with the impregnating resin, a fiber-containing moldable plastic, capable of flow, which is able to penetrate the hollow spaces between non-thickened and thickened slot insulation if sufficient pressure is being applied. Hollow spaces that are filled with the fiber-filled molding material insure that the regions of transition from thick to thin wall thicknesses of the slot insulation become homogeneous and resistant to cracking so that these regions will then meet highly demanding requirements for electrical and mechanical strength.

BRIEF DESCRIPTION OF DRAWINGS

The appended drawings illustrate practical examples which show, in simplified manner, the composition of the molded plastic to be used for slot insulation in accordance with the invention.

DETAILED DESCRIPTION OF PREFERRED EMBODIMENT

Figure 1:
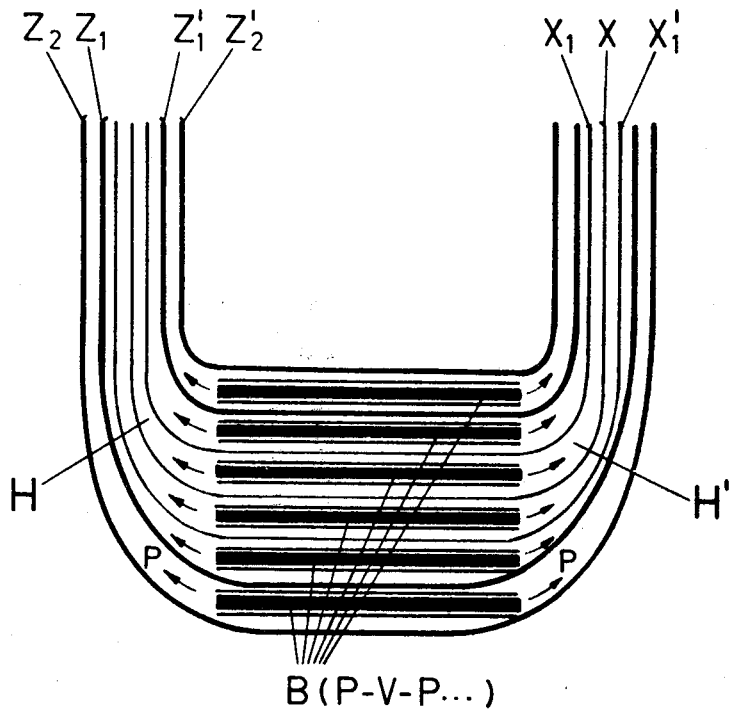
FIG. 1 shows a thickened region in cross section.
Figure 4:
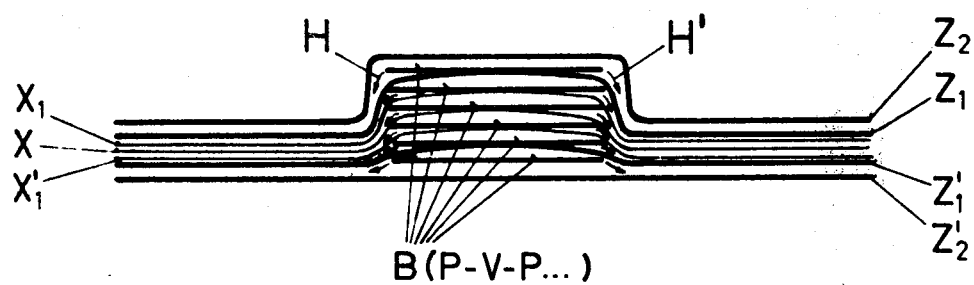
FIG. 4 shows in cross-section a profile of a moldable plastic band with a thickened region.

The slot insulation shown in FIG. 1 is symmetrically formed, with three plies of paper $X_1$, $X$, $X_1'$ arranged in the center, preferably an aromatic polyamide paper, for example, as known under the tradename "Nomex Aramidpapier". The paper plies $X_1$, $X$, $X_1'$ are covered on both sides by fiber-reinforced outer layers $Z_1$, $Z_2$, on one side, and $Z_1'$, $Z_2'$, on the other side, which preferably consist of woven glass filaments, thus insuring in known manner the mechanical strength and rigidity of the slot insulation. The paper plies and the woven glass reinforcing layers are resin-impregnated and/or resin coated with the same resin, preferably with an epoxide resin. This laminated material can be arranged in any other manner if required and practical. This basic structure of the laminated material, where the individual layers extend throughout the entire length, is thickened at desired regions of the slot insulation into multiples of the basic slot insulation by inserting reinforcing plies. These reinforcing plies V, each forming a packet B (P-V-P...) as illustrated clearly in FIG. 2, consist in the example shown of three woven glass filaments $V_1$, $V_2$, $V_3$ where each ply is covered on both sides by strips of fiber-filled molding material $P_1$, $P_2$, $P_3$, $P_4$ or by a packet B (V-P-V..), not illustrated, where each strip P of fiber-filled molding material is covered on both sides by a reinforcing ply V. Roving fabrics or glass mats can also be used for the reinforcing plies V. The individual packets B (P-V-P.. or V-P-V.. respectively) are inserted between the several continuous resin-impregnated and/or resin-coated carrier bands $Z_2$, $Z_1$, $X_1$, $X$, $X_1'$, $Z_1'$, $Z_2'$ of the laminated, moldable material in non-continuous regions as shown in FIG. 1. The strips P made from fiber-filled molding material are prepared preferably from an epoxide resin which contain short E-glass-fibers. Any existing hollow spaces H, H' which occur in the regions of transition from thick to thin slot wall thickness, indicated in FIGS. 1 and 4 by arrows, will be filled during the subsequent compression homogeneously with fiber-filled molding material. The slot insulation prepared in this manner can be utilized as a U-profile with thickened base or, after a cut through the base, as two L-shaped profiles with thickened leg.

Figure 2:
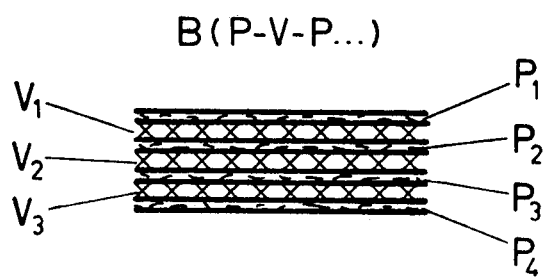
FIG. 2 shows a cross-sectional area of a packet of reinforcing plies and fiber-filled strips of molding material.
Figure 3:
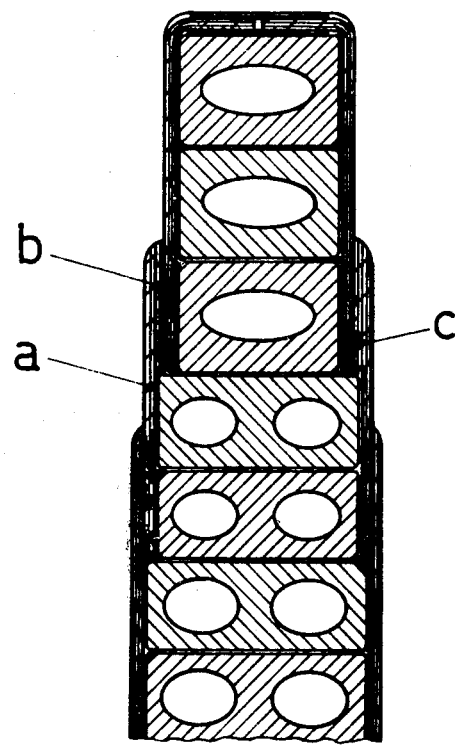
FIG. 3 shows a part of a rotor slot with inserted thickened profile of a molded plastic band in cross-section.

FIG. 3 shows a practical example for thickened laminated and compressed bands inserted in a rotor slot. In the case of the known, above-discussed methods such slot thickening is manufactured from two bands a, b of laminated and compressed material which are prepared separately and are glued together, where the surfaces of the two bands to be bonded together must first be rubbed down to insure proper tolerances and adhesiveness. The composition of the thickened slot insulation part c, which takes the place of the two parts a and b, prepared in accordance with the method proposed by the invention and shown in FIG. 4, has, for reasons of simplicity, been made identical to the composition of the laminated and compressed material used, and shown by FIG. 1, for the slot insulation. Here again, the reinforcing plies Z, P are inserted in the form of a packet B (P-V-P...) as shown by FIG. 2, or in the form of a packet B (V-P-V..) between the resin-impregnated carrier bands $Z_2$, $Z_1$, $X_1$, $X$, $X_1'$, $Z_1'$, $Z_2'$, and the hollow spaces H, H', again indicated by arrows, will be filled homogeneously during the subsequent compression with fiber-filled molding material P, similar to the operation described in connection with FIG. 1. The thickened slot insulation profile is manufactured in the form of a twin-profiled part and can be separated, for example, by bisecting, if desired, to form two L-shaped insulation members, but without the need for any further processing.

The objective of the invention is not limited to the examples given above. It is possible to prepare and use in place of a slot insulation that consists of one non-thickened and one thickened leg, a slot-insulating profile with two or more thickened sections.

I claim:

1. A profiled laminated insulation material having adjacent leg portions disposed at a right angle to each other for installation in the slots of a dynamo-electric machine which comprises a number of carrier bands of a resin treated insulation material extending throughout both leg portions, and at least one reinforcing ply of insulation material and strip of a fiber-filled resinous molding material capable of flow under pressure interposed between adjacent carrier bands throughout one of said leg portions to impart increased thickness thereto, said resinous molding material also being extended into and homogeneously filling the spaces in the transition region between the thickened and non-thickened leg portions.

2. A laminated insulation material as defined in claim 1 having three legs forming a U-shaped profile.

3. A laminated insulation material as defined in claim 1 having two legs forming an L-shaped profile.

4. A laminated insulation material as defined in claim 1 wherein said strips of fiber-filled molding material are made from an epoxide resin containing short E-glass-fibers.

5. The method for manufacturing profiled laminated insulation material for installation in the slots of a dynamo-electric machine which comprises the steps of:
assembling a number of carrier bands of resin-treated insulation material for lamination each to the other,
inserting at least one reinforcing ply of insulation material capable of flow under pressure and strip of a fiber-filled resinous molding material between adjacent carrier bands at regions thereof desired to impart increased thickness to the final laminated structure, and
pressing the assembly of carrier bands, reinforcing plies, and strips of fiber-filled molding material to effect lamination thereof and penetration of the molding material into and filling the spaces in transition regions between thickened and non-thickened parts of the laminated structure.

6. The method as defined in claim 5 for manufacturing profiled laminated insulation wherein at least one reinforcing ply covered on both sides with fiber filled molding material is formed into a packet and inserted between said carrier bands of insulation material.

7. The method as defined in claim 5 for manufacturing profiled laminated insulation wherein at least one strip of fiber-filled molding material covered on both sides with reinforcing plies is formed into a packet and inserted between said bands of insulation material.

8. The method as defined in claim 5 for manufacturing profiled laminated insulation wherein said strips of fiber-filled molding material are made from an epoxide resin containing short E-glass-fibers.

9. The method as defined in claim 5 for manufacturing profiled laminated insulation wherein said reinforcing plies are made from woven glass filamentary material.

10. The method as defined in claim 5 for manufacturing profiled laminated insulation wherein said resin-treated carrier bands include inner bands made from an aromatic polyamide paper and outer bands made from woven glass filaments.

11. A method for producing a laminated insulation structure for installation in the slots of a dynamo-electric machine comprising the steps of:
assembling a number of layers of insulation material, including one or more layers of resin-treated paper and at least one layer of resin-treated woven glass filaments covering each side of said one or more layers of resin-treated paper, for lamination to each other;
inserting at least one ply of fiber-reinforced insulation material and at least one strip of a fiber-filled epoxy resin between adjacent layers of the insulation material to impart increased thickness to a predetermined region of the laminated structure; and
supplying sufficient pressure to the assembly of the layers of insulation material, fiber-reinforced ply and epoxy resin to cause lamination thereof and flow of some of the epoxy resin into spaces in the transition areas between the predetermined thickened region and the non-thickened portions of the structure.

* * * * *